UNITED STATES PATENT OFFICE.

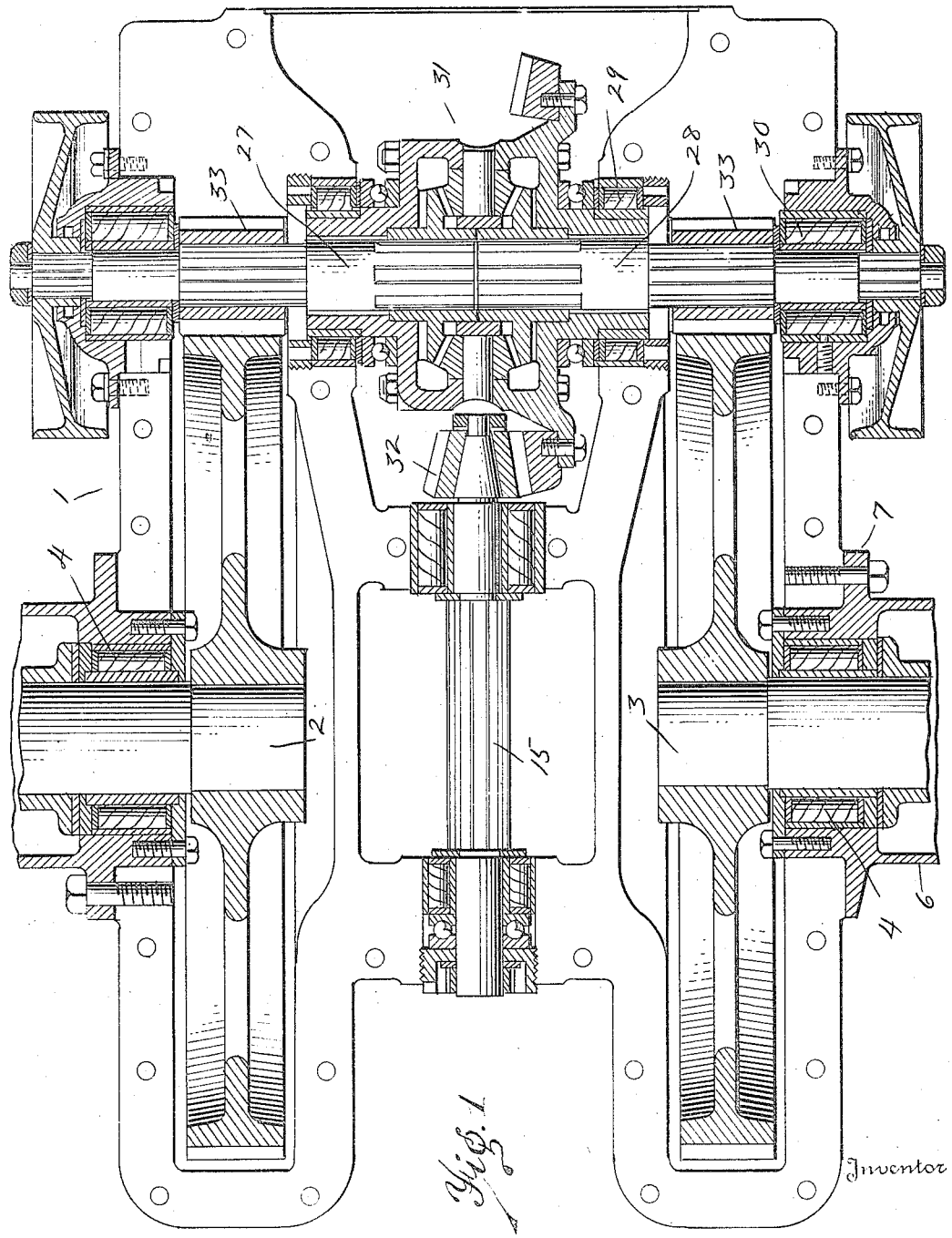

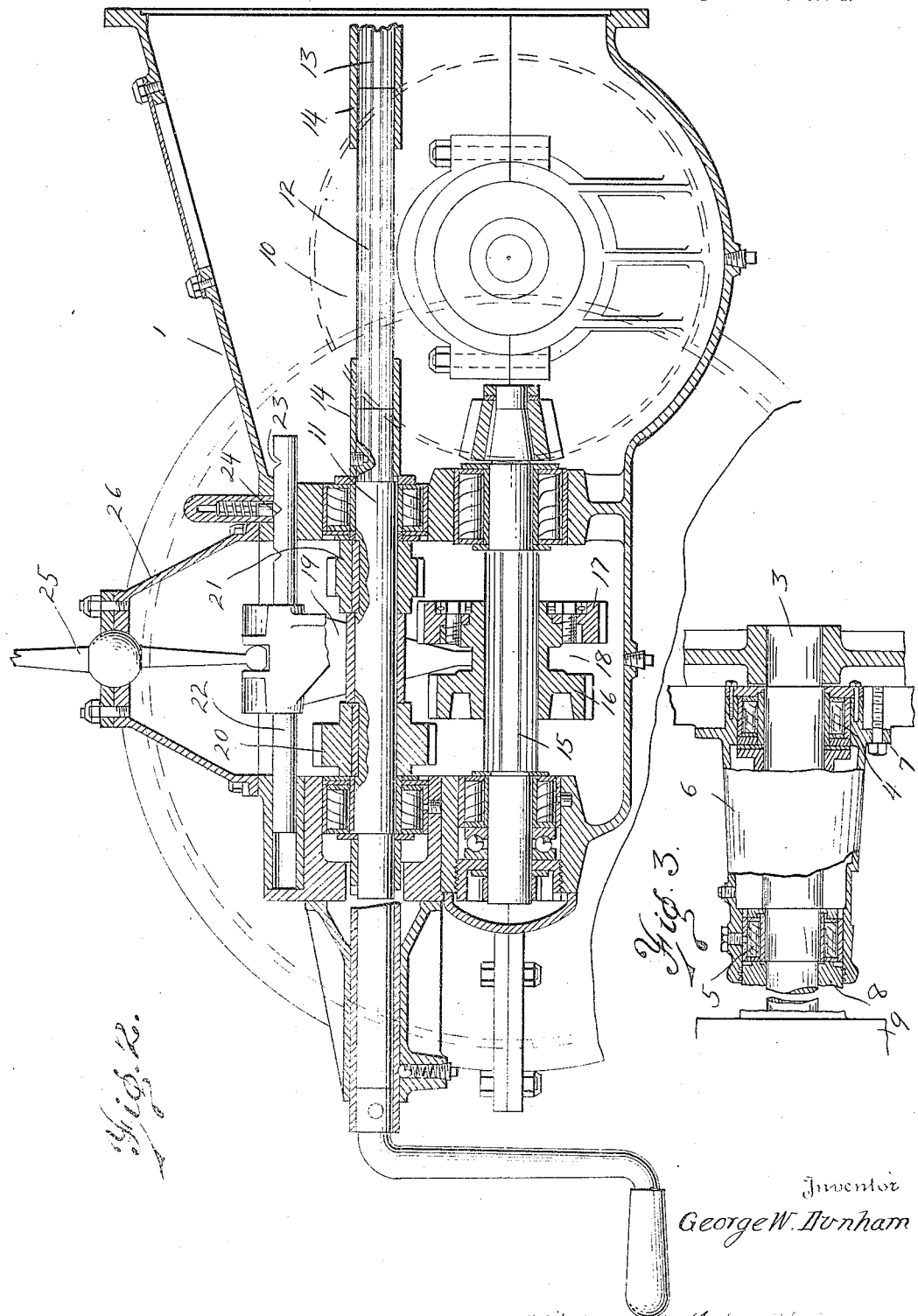

GEORGE W. DUNHAM, OF NEW YORK, N. Y., ASSIGNOR TO GRAHAM BROTHERS, OF EVANSVILLE, INDIANA, A CORPORATION OF INDIANA.

TRACTOR GEARING.

1,419,240.  Specification of Letters Patent.  Patented June 13, 1922.

Application filed January 30, 1920. Serial No. 355,156.

*To all whom it may concern:*

Be it known that I, GEORGE W. DUNHAM, a citizen of the United States of America, residing at New York, in the county of New York and State of New York, have invented certain new and useful Improvements in Tractor Gearing, of which the following is a specification, reference being had therein to the accompanying drawings.

The invention relates to tractors and refers more particularly to the arrangement of the transmission. One object of the invention is to so arrange the transmission first that the length of the tractor can be greatly decreased and second that the weight of the transmission will be substantially located forward of the drive shafts to assist in preventing the tractor from tilting backwardly. Other objects of the invention reside in the novel arrangements and combination of parts as more fully hereinafter set forth.

In the drawings:

Figure 1 is a horizontal section through the transmission housing of the tractor showing the transmission embodying my invention;

Figure 2 is a central longitudinal section therethrough;

Figure 3 is a sectional elevation showing a portion of the rear axle.

1 is the transmission housing and 2 and 3 the drive shafts forming the rear axle. These shafts are aligned stub shafts having their inner ends spaced from each other and each stub shaft is journalled near its inner end in a suitable bearing 4 in the transmission housing and near its outer end in a suitable bearing 5 in one of the oppositely-extending housing extensions 6 which are preferably formed separately from and bolted to the sides of the transmission housing 1 at 7. The hubs 8 of the tractor drive wheels 9 are adjacent to the bearings 5.

10 is the transmission main drive shaft which is formed of the sections 11, 12 and 13 non-rotatably secured to each other by means of the sleeves 14 upon adjacent ends of the rear section 11 and intermediate section 12 and front section 13. The front section 13 is adapted to be operatively connected to the tractor engine. The rear section 11 extends between the inner ends of the stub drive shafts 2 and 3. 15 is the transmission counter-shaft located between the inner ends of the stub drive shafts and carrying the multiple change-speed gears 16 and 17 which are splined thereto. These gears are preferably integral and form the groove 18 therebetween which is engaged by the shifter fork 19 for moving the gears. 20 and 21 are cooperating multiple change-speed gears fixedly mounted upon the rear section 11 of the main drive shaft, these gears being adapted for engagement respectively with the gears 16 and 17.

The shifter fork 19 is mounted upon the shifter rod 22 which longitudinally slidably engages in bearings in the transmission housing 1. The shifter rod 22 is provided with the series of recesses 23 at one end engageable by the spring pressed detent 24 for yieldably locating the shifter rod in its adjusted positions. 25 is a shifter lever for actuating the shifter fork and its rod, this shifter lever being pivotally mounted in the cap or extension 26 bolted upon the transmission housing 1.

27 and 28 are jack shafts located forward of the stub drive shafts 2 and 3 and rotatably mounted in suitable bearings 29 and 30 in the transmission housing 1. These jack shafts are preferably below the transmission main drive shaft 10 which extends thereover. 31 is the differential gearing mounted upon the adjacent ends of the jack shafts and connected thereto, this differential gearing being adapted to be driven by the bevel pinion 32 upon the forward end of the counter-shaft 15. 33 are pinions or spur gears non-rotatably secured upon the jack shafts as by being splined thereto, and located between the bearings 29 and 30. These pinions or spur gears are in mesh with the gear wheels 34 keyed upon the inner ends of the stub drive shafts, the hubs of the gear wheels being adjacent the bearings 4.

From the above description it will be readily seen that due to having the multiple change-speed gearing located between the inner ends of the stub drive shafts the length of the tractor is greatly decreased. Furthermore by having the differential gearing located forward of the stub drive shafts the weight of this gearing assists in preventing the backward tilting of the tractor. Also the total weight of the transmission housing is decreased by having the differential gearing located forward of the drive shafts instead of in rear of the same.

What I claim as my invention is:

1. The combination with drive shafts in substantial alignment with each other and having their inner ends spaced, of jack shafts located forward of said drive shafts, gear wheels upon the inner ends of said drive shafts and pinions upon said jack shafts engaging said gear wheels, differential gearing upon the adjacent ends of said jack shafts, a main drive shaft adapted for connection with an engine, and extending over said differential gearing and having its rear portion extending between the inner ends of said drive shafts, a counter-shaft in substantial parallelism with said main drive shaft, multiple change-speed gears upon said shafts, means for shifting said gears into mesh with each other and a pinion upon the forward end of said counter-shaft and in driving engagement with said differential gearing.

2. The combination with a transmission housing, of substantially aligned drive shafts journalled in said housing and having their inner ends extending inwardly beyond the journals and spaced from each other, jack shafts located forward of said drive shafts, gear wheels upon the inner ends of said drive shafts, pinions upon said jack shafts engaging said gear wheels, differential gearing upon the adjacent ends of said jack shafts, a main drive shaft adapted for connection with an engine and extending over said differential gearing and having its rear portion extending between the inner ends of said drive shafts, a counter-shaft in substantial parallelism with said main drive shaft, means for driving said counter shaft from said main drive shaft, and a pinion upon the forward end of said counter-shaft and in driving engagement with said differential gearing.

In testimony whereof I affix my signature.

GEORGE W. DUNHAM.